United States Patent

Mizuno et al.

[11] Patent Number: 5,518,804
[45] Date of Patent: May 21, 1996

[54] MAGNETIC RECORDING MEDIUM

[75] Inventors: Chiaki Mizuno; Tsutomu Sugisaki; Masaya Kojima, all of Kanagawa, Japan

[73] Assignee: Fuji Photo Film Co., Ltd., Kanagawa, Japan

[21] Appl. No.: 278,124

[22] Filed: Jul. 21, 1994

Related U.S. Application Data

[63] Continuation of Ser. No. 804,707, Dec. 11, 1991, abandoned.

[30] Foreign Application Priority Data

Dec. 20, 1990 [JP] Japan ..................... 2-404485
Jan. 24, 1991 [JP] Japan ..................... 3-007239

[51] Int. Cl.⁶ ..................... G11B 5/66; B32B 7/02; B32B 5/16
[52] U.S. Cl. ..................... 428/212; 428/323; 428/329; 428/336; 428/694 B; 428/694 BA; 428/694 BH; 428/694 BM; 428/694 BS; 428/900
[58] Field of Search ..................... 428/212, 329, 428/323, 336, 900, 694 B, 694 BA, 694 BH, 694 BM, 694 BS

[56] References Cited

U.S. PATENT DOCUMENTS

| 4,442,159 | 4/1984 | Dezawa et al. | 428/212 |
| 4,624,883 | 11/1986 | Yamaguchi et al. | 428/212 |
| 4,643,941 | 2/1987 | Miyoshi et al. | 428/323 |
| 4,977,040 | 12/1990 | Yano et al. | 428/692 |
| 5,156,908 | 10/1992 | Araki et al. | 428/323 |

FOREIGN PATENT DOCUMENTS

| 40-23745 | 10/1965 | Japan. |
| 61-54992 | 3/1986 | Japan. |
| 61-139929 | 6/1986 | Japan. |

*Primary Examiner*—Leszek Kiliman
*Attorney, Agent, or Firm*—Sughrue, Mion, Zinn, Macpeak & Seas

[57] ABSTRACT

In a magnetic recording medium comprising a nonmagnetic substrate, a first magnetic layer, and a second magnetic layer mounted in this order, the first magnetic layer has a greater coercive force and a lower residual flux density than the second magnetic layer. When the second magnetic layer is directly mounted on the first magnetic layer, the second magnetic layer has a thickness within the range of 0.05–0.5 μm and a coercive force within the range of 1200–2000 Oe while the first magnetic layer has a coercive force greater than that of the second magnetic layer by 800–2500 Oe and a residual flux density in the range of 30–70% of that of the second magnetic layer. When a nonmagnetic layer is held between the first and second magnetic layers, the first magnetic layer has a coercive force not smaller than 2000 Oe and a residual flux density not greater than 70% of that of the second magnetic layer while the second magnetic layer has a coercive force not smaller than 1200 Oe, a residual flux density not lower than 1600 G, and a thickness not greater than 0.5 μm.

10 Claims, 1 Drawing Sheet

MAGNETIC RECORDING MEDIUM

This is a Continuation of application Ser. No. 07/804,707, filed Dec. 11, 1991 now abandoned.

BACKGROUND OF THE INVENTION

Field of the Invention

The present invention relates to a magnetic recording medium for high-density recording. More particularly, the present invention relates to a magnetic recording medium which is suitable for a magnetic recording disk used for data recording.

Description of the Prior Art

The need for higher density recording has recently been increasing in the field of magnetic recording. In a coating type magnetic recording medium, various techniques have been proposed for decreasing the particle size of a ferromagnetic powder, for improving the dispersibility thereof, and for improving the packing density thereof in a magnetic layer. Also, as a more effective means, ferromagnetic powders with improved magnetic characteristics have been used.

As minicomputers, personal computers, and the like have come into wide use as office machine, the use of magnetic recording disks has remarkably increased as external memory means. There has been demands for reducing the size and improving the recording density of the medium. In particular, the recording density with a minimum recording wavelength of not more than 3.0 µm or, more preferably, not more than 1.5 µm has been required. In order to satisfy these demands, the use of a medium in which a ferromagnetic metal powder is used has been studied.

Since such a magnetic recording disk is used for recording a digital signal, a servo signal for determining a track position has to be written therein. Methods for writing the servo signal include a method in which the servo signal is written in the back surface of the disk, a so-called sector method in which the servo signal is recorded within a sector formed in the same plane as the recording layer, and a so-called embedding method in which the servo signal is written in the lowest of a plurality of magnetic layers. The last-mentioned embedding method is the most advantageous when a high recording density in the medium is intended.

A magnetic recording medium in which the embedding method is used is disclosed in Japanese Patent Publication No. 40(1965)-23745. According to the disclosure of this publication, the coercive force of the lower magnetic layer is increased such that the ratio of the coercive force of the lower magnetic layer to that of the upper magnetic layer is 5/1 or in the range of 8/1 to 10/1.

However, in cases where a magnetic layer with a ferromagnetic metal powder is used, there has been a problem that the writing of the servo signal becomes difficult when the coercive force of the lower magnetic layer is much higher than that of the upper magnetic layer.

In particular, when high-density recording with a recording wavelength of not longer than 3.0 µm is intended, it has become difficult for the data recording signal in the upper magnetic layer and the servo recording signal in the lower magnetic layer to be recorded stably to each other. For example, there have been cases where a magnetic head may not follow recording tracks accurately and, accordingly, fluctuations in the output may become so large that data signals cannot be read out faithfully. More particularly, when a digital data signal with a recording wavelength in the order of 0.5 to 2µm and a track-positioning signal are respectively recorded in the upper and lower magnetic layers, there have been cases where the servo signal may be weakened or erased under the influence of the magnetic signal in the upper magnetic layer as the data signals are written and erased repeatedly and, accordingly, the output may become too low for practical use.

On the other hand, in order to record data in the upper magnetic recording layer with a high density, it has been necessary for the layer to have a small thickness. In this case, it has been difficult to maintain the servo signal in the lower magnetic layer stably.

Conventionally, there has not been known any magnetic recording medium in which the data signal can be recorded with a high density while the servo signal can be maintained stably.

SUMMARY OF THE INVENTION

In view of the foregoing problems of the prior art, the object of the present invention is to provide a magnetic recording medium which is the most suitable for a magnetic disk used for data recording.

More particularly, the object of the present invention is to provide a magnetic recording medium in which no readout/writing errors or the like occur due to deterioration of the servo signal even when data recording is repeated and in which data can be recorded with a short wavelength and a narrow track width to improve the recording density.

The first magnetic recording medium of the present invention comprises a nonmagnetic substrate and first and second magnetic layers formed thereon. The first and second magnetic layers are mainly composed of a ferromagnetic powder and a binder resin. The second magnetic layer, which is placed on the first magnetic layer, has a thickness within the range of 0.05–0.5 µm and a coercive force within the range of 1200–2000 Oe and comprises a ferromagnetic metal powder. The first magnetic layer has an antitimagnetic force greater than that of the second magnetic layer by 800–2500 Oe. The residual flux density of the first magnetic layer alone is 30–70% of that of the second magnetic layer alone.

In the first magnetic recording medium of the present invention, since two magnetic layers are formed on the nonmagnetic substrate and the second magnetic layer comprises a ferromagnetic metal powder and has a thickness not greater than 0.5 µm, the second magnetic layer can be used as a recording layer suitable for high-density recording. Also, since the first magnetic layer has a relatively large coercive force, the servo signal recorded in the first magnetic layer cannot be erased even when data such as a digital signal is written thereon. Accordingly, a magnetic recording medium which is the most suitable for a magnetic recording disk which can record data with a minimum recording wavelength of 3.0 µm or less, for example, can be provided in accordance with the present invention.

Further, since the residual flux density of the first magnetic layer by itself is restricted to a range which is lower than that of the second magnetic layer, the data recorded in the second magnetic layer cannot be erased by the servo signal recorded in the first magnetic layer.

The coercive force of the first magnetic layer in the first magnetic recording medium in accordance with the present invention is within the range of 1200–2000 Oe and, preferably, within the range of 1300–1800 Oe. In cases where the coercive force is too small, the output of the signal is decreased by the self-demagnetization effect of the layer when a favorable electromagnetic transducing characteristic is to be obtained at a short wavelength region with the recording wavelength in the order of not longer than 3.0 μm. Accordingly, the recording density cannot be increased greatly in these cases. On the other hand, in cases where the coercive force is too large, the magnetic head cannot reverse magnetization and, accordingly, data cannot be written sufficiently. Also, a large energy will be needed for data recording. Accordingly, the latter cases are also unfavorable.

The thickness of the second magnetic layer in the first magnetic recording medium in accordance with the present invention is within the range of 0.05–0.5 μm and, preferably, within the range of 0.07–0.45 μm.

The first magnetic layer preferably has a thickness within the range of 0.8–2.5 μm. The total thickness of the magnetic layers is preferably within the range of 1.0–3.0 μm.

When the thickness of the second magnetic layer is too small, the data to be written in the second magnetic layer is overwritten on the servo signal in the first magnetic layer, while the data signal written in the second magnetic layer is likely to be affected and erased by the servo signal in the first magnetic layer. These results are unfavorable. On the other hand, when the thickness of the second magnetic layer is too large, the output of the servo signal is lowered due to void loss and, accordingly, the data cannot be read out easily. Also, due to thickness loss, the recording density cannot be increased sufficiently.

The coercive force of the first magnetic layer is greater than that of the second magnetic layer by 800–2000 Oe and, preferably, by 900–2300 Oe.

When the coercive force of the second magnetic layer is too small, the recording stability of the servo signal becomes a problem. For example, the servo signal is likely to be erased when data are written in the second magnetic layer. On the other hand, when it is too large, writing becomes difficult.

When a ferromagnetic metal powder is used in the first magnetic layer in the first magnetic recording medium in accordance with the present invention, it can be selected from the same view point as that of the second magnetic layer except for the coercive force.

In the first magnetic recording medium in accordance with the present invention, the residual flux density of the first magnetic layer is 30–70% and, preferably, 35–65% of that of the second magnetic layer.

When the residual flux density of the first magnetic layer is too low, the magnetic head cannot read out the servo signal sufficiently. On the other hand, when it is too high, the data recorded in the second magnetic layer are unfavorably erased or demagnetized thereby.

As described in the foregoing, in an embedding-servo type magnetic recording medium which can record and reproduce data with a high density, the second magnetic layer comprises a ferromagnetic metal powder as a ferromagnetic powder and has a small thickness and a coercive force greater than that of the first magnetic force, while the residual flux density of the first magnetic layer is lower than that of the second magnetic layer. Accordingly, a magnetic recording medium which is suitable for recording and reproducing digital signals and which exhibits good recording and reproducing characteristics in a short wavelength region with a minimum recording wavelength of 3.0 μm or less can be obtained in accordance with the present invention.

The second magnetic recording medium in accordance with the present invention comprises a nonmagnetic substrate, a first magnetic layer, a nonmagnetic layer, and a second magnetic layer mounted in this order. The first magnetic layer has a coercive force not smaller than 2000 Oe and a residual flux density not greater than 70% of that of the second magnetic layer. The nonmagnetic layer has a thickness within the range of 0.05–0.3 μm. The second magnetic layer has a coercive force not lower than 1200 Oe, a residual flux density not lower than 1600G, and a thickness not greater than 0.5 μm.

In the second magnetic recording medium in accordance with the present invention, since the coercive force of the first magnetic layer is large, the stability of the servo signal recorded therein can be improved. Also, since the residual flux density of the first magnetic layer is lower than that of the second magnetic recording layer, the stability of the data signal recorded in the second magnetic recording layer cannot be affected by the first magnetic layer. Further, since the nonmagnetic layer having a thickness within the range of 0.05–0.3 μm is formed between the first and second magnetic layers, the servo signal in the first magnetic layer is hard to be affected by the data recording signal recorded in the second magnetic layer. Besides, since the second magnetic layer has a thickness not larger than 0.5 μm and a coercive force and a residual flux force which are not smaller than predetermined levels, data can be recorded therein with a high density with a recording wavelength of 3.0 μm or less.

Accordingly, in the second magnetic recording medium in accordance with the present invention, a high-density digital data recording signal can be recorded and erased repeatedly without reducing the output of the servo signal recorded in the first magnetic layer.

In the second magnetic recording medium in accordance with the present invention, the stability of the servo signal can be improved when the nonmagnetic layer is made thicker to decrease the influence of the data signal recorded in the second magnetic layer on the servo signal in the first magnetic layer. However, when the nonmagnetic layer is too thick, the accuracy for reading out the servo signal decreases. In view of these points, the thickness of the nonmagnetic layer should be within the range of 0.05–0.3 μm. Preferably, the thickness of the nonmagnetic layer is within the range of 0.1–0.25 μm. Also, in order to improve the surface characteristic of the second magnetic layer, it is preferable to use a smooth nonmagnetic layer.

In order to enable high-density data recording with a recording wavelength of 3.0 μm or less, the second magnetic layer in the second magnetic recording medium in accordance with the present invention has a residual flux density of not smaller than 1600G. It has a coercive force not smaller than 1200 Oe and, preferably, not smaller than 1500 Oe since a small coercive force decreases the output of the signal due to the self-demagnetization effect thereof. However, since it may be difficult for the magnetic head to reverse magnetization when the coercive force of the second magnetic layer is too large, the coercive force is preferably within the range of 1200–1800 Oe and, more preferably, within the range of 1500–1800 Oe. Also, in order to prevent it from affecting the first magnetic layer, the coercive force of the second magnetic layer is preferably not more than 75% of that of the first magnetic layer. The thickness of the second magnetic layer is not more than 0.5 μm and, preferably, not more than 0.2 μm since a too large thickness decreases the output of the servo signal due to void loss. On the other hand, there is a possibility that the data signal may be overwritten on the signal of the first magnetic layer when the second magnetic recording layer is too thin. Accordingly, the thickness of the second magnetic layer is preferably within the range of 0.05–0.5 μm and, more preferably, within the range of 0.05–0.2 μm. The second magnetic layer can be formed like the first magnetic layer except for the consideration of the coercive force, residual flux density, and thickness.

In order to improve the stability of the servo signal, the first magnetic layer of the second magnetic recording medium in accordance with the present invention has a coercive force of not smaller than 2000 Oe, preferably not smaller than 2200 Oe, and more preferably not smaller than 3500 Oe. In order to prevent the data signal recorded in the second magnetic layer from being affected thereby, the residual flux density of the first magnetic layer is not greater than 70% and, preferably, is within the range of 30–70% of that of the second magnetic layer.

The nonmagnetic layer can be formed of a vapor deposition film of Al, Si, or the like or a resin coating comprising a vinyl chloride-vinyl acetate copolymer, a polyurethane resin, a polyester resin, a polyether resin, a polyvinylbutyral resin, an epoxy resin, an isocyanate resin, or the like. The nonmagnetic layer can contain an electrically-conductive particle to prevent the magnetic recording medium from being charged. As the electrically-conductive particle, carbon black or the like can be used.

In the following, the components which are common in the first and second magnetic recording media in accordance with the present invention will be explained.

Preferably, the first magnetic layer contains a ferromagnetic metal layer or a plate-like hexagonal ferrite. Since a relatively large coercive force can be obtained easily and the residual flux density is not so high as compared with the coercive force thereof, the plate-like hexagonal ferrite is particularly preferable.

The plate-like hexagonal ferrite is a ferromagnetic body which has a planar form and in which an axis of easy magnetization exists in the direction perpendicular to the plane. It includes barium ferrite, strontium ferrite, lead ferrite, calcium ferrite, cobalt-substituted products thereof, and the like. Among others, the cobalt-substituted product of barium ferrite and that of strontium ferrite are preferable. Also, in order to improve characteristics thereof, such an element as In, Ge, Nb, or V can be added thereto.

When a very small plate-like hexagonal ferrite powder having a specific surface area not smaller than 25 m$^2$/g, a plate ratio within the range of 2–6, and a particle length within the range of 0.02–1.0 μm is used, the recording density can further be increased. The saturation magnetization thereof is preferably not smaller than 50 emu/g and, more preferably, not smaller than 53 emu/g.

As the ferromagnetic-metal powder, a metal or an alloy which is mainly composed of Fe, Fe—Co, Fe—Ni, Fe—Ni—Co, or the like can be used. Preferably, it has a specific surface area within the range of 30–60 m$^2$/g and a crystallite size within the range of 100–300 Å as determined by an X-ray diffraction method. The axial ratio thereof is preferably not smaller than 5.

In order to improve characteristics of the ferromagnetic metal powder, such a nonmetal as B, C, Al, Si, or P can be added to the composition. Usually, in order to chemically stabilize the ferromagnetic metal powder, a layer of an oxide is formed thereon.

As a binder resin, the magnetic layer of the present invention can contain the conventionally-known thermoplastic resin, thermosetting resin, reactive resin, a mixture thereof, or the like. For example, a vinyl chloride copolymer, an acrylate ester copolymer, a methacrylate copolymer, urethane elastomer, a cellulose derivative, an epoxy-amide resin, or a polycarbonate resin can be used. As a curing agent, various polyisocyanate can be used.

In general, 5–300 parts by weight of the binder resin is used for 100 parts by weight of the ferromagnetic powder. Preferably, in order to facilitate the dispersion of the ferromagnetic powder, sulfonate group, hydroxyl group, amino group, epoxy group, or the like is introduced into the binder resin. The introduction of these groups is particularly effective when the ferromagnetic powder is made of fine particles of the ferromagnetic metal powder or hexagonal ferrite.

In addition to the ferromagnetic powder and the binder resin, a lubricant, an abrasive, an antidispersing agent, an antistatic agent, or the like can be incorporated in the magnetic layer when necessary.

As the lubricant, fatty acid esters are the most effective. Among others, a compound obtained by condensation of a fatty acid having 6–22 carbons and an alcohol having 4–22 carbons is preferable. Typically, butyl caprylate, butyl laurate, octyl laurate, butyl myristate, octyl myristate, ethyl palmitate, butyl palmitate, ethyl stearate, butyl stearate, octyl stearate, amyl stearate, anhydrosorbitan monostearate, anhydrosorbitan distearate, anhydrosorbitan tristearate, hexadecyl stearate, oleyl oleate, lauryl alcohol, or the like can be used. Among others, butyl myristate, butyl stearate, ethyl stearate, hexadecyl stearate, and oleyl oleate are particularly preferable. Also, silicone oil, graphite, molybdenum disulfide, boron nitride, fluoric graphite, fluorine alcohol, polyolefin, polyglycol, alkyl phosphate ester, tungsten disulfide, or the like can be used as the lubricant.

Preferably, 3–20 parts by weight of the lubricant is added to 100 parts by weight of the ferromagnetic powder. Sufficient running durability cannot be obtained in high or low temperature when the amount of the lubricant is too small, while the physical property of the magnetic layer deteriorates and, in particular, dropout may occur in a high-temperature environment when the amount is too large.

As the abrasive, the one having a Mohs' hardness not lower than 6 such as molten alumina, silicon carbide, chromium oxide, corundum, artificial corundum, diamond particles, garnet, or emery can be used. The particle size of the abrasive is such that the average particle diameter is preferably within the range of 0.3–1.0 μm and, more preferably within the range of 0.4–0.8 μm. Sufficient durability cannot be obtained when the amount of the lubricant in the magnetic layer is too small, while the output decreases when the amount is too large. Accordingly, the addition of 5–20 parts by weight of the abrasive to 100 parts by weight of the ferromagnetic powder is preferable.

A composition containing the above-mentioned ingredients is dispersed in a solvent to form a coating liquid. It is then applied to the surface of a nonmagnetic body (the nonmagnetic substrate or nonmagnetic layer). When necessary, the coated liquid is oriented. After the coated liquid is dried, the laminate thus formed is cut into a desired form such as a disk-like form to accomplish the magnetic recording medium in accordance with the present invention.

As the nonmagnetic substrate in the present invention, a plastic such as polyethylene terephthalate, polyimide, polyamide, polyvinyl chloride, cellulose triacetate, polycarbonate, polyethylene naphthalate is preferably used.

A so-called wet-on-wet coating method disclosed in Japanese Unexamined Patent Publication No.61(1986)-139929 and No.61(1986)-54992 is particularly effective for mounting the nonmagnetic substrate, the first magnetic layer, and the nonmagnetic layer and/or the second magnetic layer in this order. The wet-on-wet method refers to such a method as a so-called successive coating method in which, after the first layer is applied, the next layer is coated thereon under a wet condition and a method in which a plurality of layers are simultaneously applied by an extrusion coating method.

DESCRIPTION OF THE PREFERRED EMBODIMENTS

Figure 1:
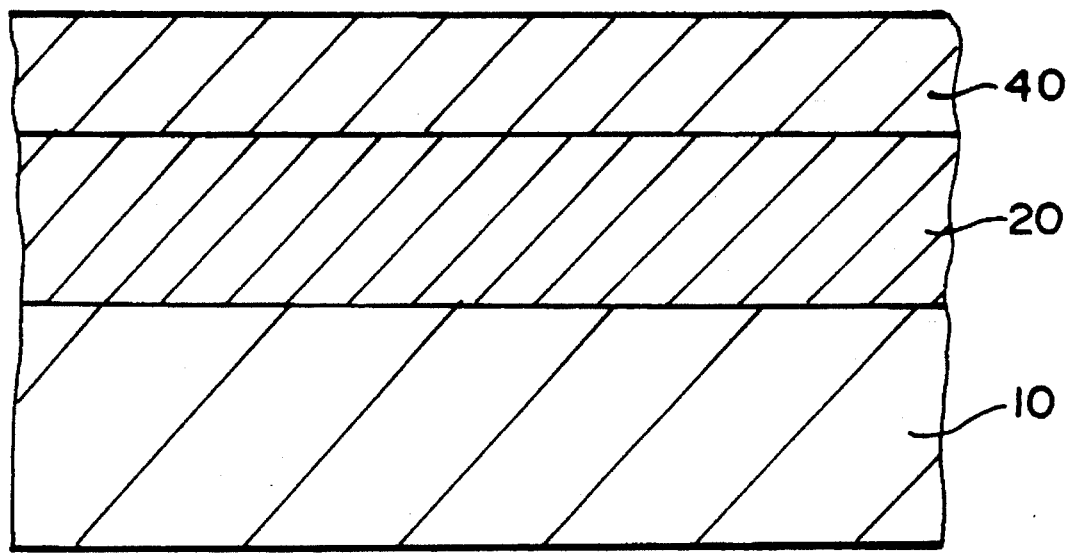
FIG. 1 is a sectional view showing an example of the first magnetic recording medium in accordance with the present invention.

FIG. 1 is a sectional view showing an example of the first magnetic recording medium in accordance with the present invention. As shown in this drawing, the first recording medium in accordance with the present invention comprises a nonmagnetic substrate 10, a first magnetic layer 20, and a second magnetic layer 40 mounted in this order.

Figure 2:
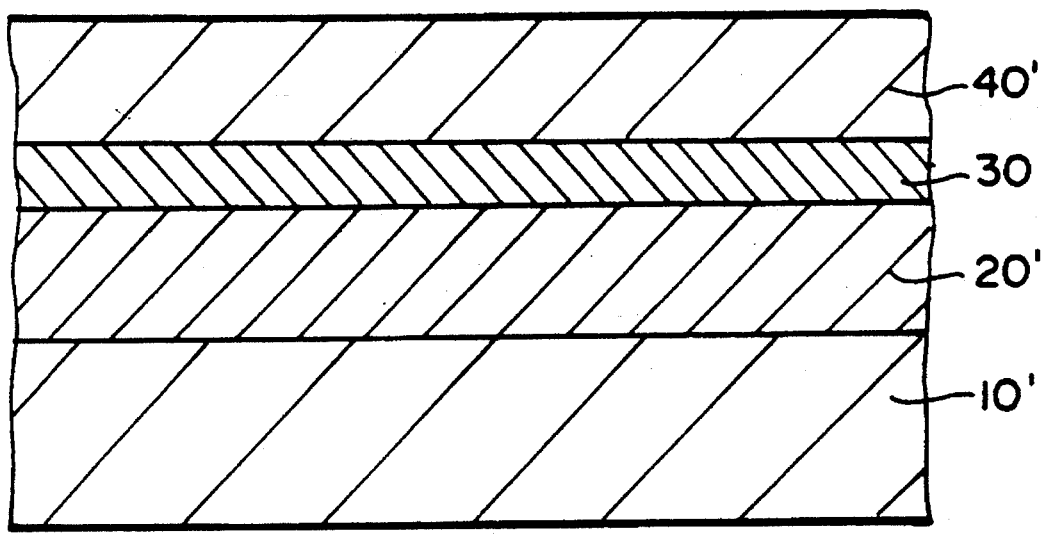
FIG. 2 is a sectional view showing an example of the second magnetic recording medium in accordance with the present invention.

FIG. 2 is a sectional view showing an example of the second magnetic recording medium in accordance with the present invention. As shown in this drawing, the second recording medium in accordance with the present invention comprises a nonmagnetic substrate 10', a first magnetic layer 20', a nonmagnetic substrate 30', and a second magnetic layer 40' mounted in this order.

EXPERIMENT I (Examples 1–4 and Comparative Examples 1–3)

First magnetic layer coating liquids were obtained with Fe—Ni—Co ferromagnetic metal powders shown in TABLE 1 in accordance with the following composition and condition.

| First Magnetic Layer Coating Liquid No. 1 | |
| --- | --- |
| Ferromagnetic metal powder (shown in Table 1) | 100 parts by weight |
| Vinyl chloride-vinyl acetate copolymer containing maleic anhydride (degree of polymerization: 400) | 17 parts by weight |
| Polyurethane resin (Nihon Polyurethane N-2301) | 7.5 parts by weight |
| Carbon black (average particle diameter: 20 nm) | 20 parts by weight |
| α-iron oxide | 30 parts by weight |
| Methyl ethyl ketone | 132 parts by weight |
| Cyclohexanone | 93.5 parts by weight |

After being kneaded by a powerful kneader, the above composition was minutely dispersed by a sand grinder. To 400 parts by weight of the minutely-dispersed liquid, the following ingredients were added and the mixture was stirred to obtain the first magnetic layer coating liquid.

| Oleic acid | 2.0 parts by weight |
| --- | --- |
| Butyl stearate | 3.0 parts by weight |
| Butoxyethyl stearate | 3.0 parts by weight |
| Polyisocyanate | 6.5 parts by weight |
| Methyl ethyl ketone | 30.5 parts by weight |
| Cyclohexanone | 21 parts by weight |

TABLE 1

| Ferromagnetic Metal Powder | Coercive Force (Oe) |
| --- | --- |
| Powder #1 | 2200 |
| Powder #2 | 2570 |
| Powder #3 | 2940 |

Second magnetic layer coating liquids were obtained with Fe—Ni ferromagnetic metal powders shown in TABLE 2 in accordance with the following composition and condition.

| Second Magnetic Layer Coating Liquid No. 1 | |
| --- | --- |
| Ferromagnetic metal powder (shown in TABLE 2) | 100 parts by weight |
| Vinyl chloride-vinyl acetate copolymer containing maleic anhydride (degree of polymerization: 400) | 14 parts by weight |
| Polyurethane resin (Nihon Polyurethane N-2301) | 5 parts by weight |
| α-Al$_2$O$_3$ (average particle diameter: 0.3 μm) | 12 parts by weight |
| Carbon black (average particle diameter: 20 nm) | 2 parts by weight |
| Methyl ethyl ketone | 192 parts by weight |
| Cyclohexanone | 95 parts by weight |

After being kneaded by a powerful kneader, the above composition was minutely dispersed by a sand grinder. To 420 parts by weight of the minutely-dispersed liquid, the following ingredients were added and the mixture was stirred to obtain the second magnetic layer coating liquid.

| Oleic acid | 1 part by weight |
| --- | --- |
| Butyl stearate | 2 parts by weight |
| Butoxyethyl stearate | 2 parts by weight |
| Polyisocyanate | 6 parts by weight |
| Methyl ethyl ketone | 46 parts by weight |
| Cyclohexanone | 23 parts by weight |

TABLE 2

| Ferromagnetic Metal Powder | Coercive Force (Oe) |
| --- | --- |
| Powder #4 | 1050 |
| Powder #5 | 1270 |
| Powder #6 | 1480 |
| Powder #7 | 1760 |
| Powder #8 | 1950 |

A polyethylene terephthalate base having a thickness of 60 μm was provided as a nonmagnetic substrate. After the first magnetic layer coating liquid was applied to one surface of the nonmagnetic substrate such that it would have a thickness of 1.2 μm when dried. Before the first coating was dried, the second magnetic layer coating liquid was coated thereon such that it would have a thickness of 0.3 μm when dried. Before the second coating was dried, the particles of the ferromagnetic powders were subjected to a random orientation processing.

Then, two magnetic layers were formed on the other surface of the nonmagnetic substrate under the same condition as described above to obtain a magnetic recording medium sample.

After being processed by a supercalender roll to smooth the magnetic layer surfaces, the magnetic recording medium sample was cut into a disk-like form. Thus, a magnetic recording disk was obtained.

TABLE 3 shows the magnetic layer constitution and magnetic characteristics of the magnetic recording disks thus obtained.

TABLE 3

| | First Magnetic Layer | | | Second Magnetic Layer | | |
|---|---|---|---|---|---|---|
| | Ferromagnetic powder | Coercive Force (Oe) | Residual Flux Density (Gauss) | Ferromagnetic powder | Coercive Force (Oe) | Residual Flux Density (Gauss) |
| Comp. Ex. 1 | #1 | 2200 | 790 | #6 | 1490 | 1620 |
| Example 1 | #2 | 2580 | 750 | #6 | 1490 | 1620 |
| Example 2 | #3 | 2950 | 710 | #6 | 1490 | 1620 |
| Comp. Ex. 2 | #2 | 2580 | 750 | #4 | 1040 | 1690 |
| Example 3 | #2 | 2580 | 750 | #5 | 1270 | 1640 |
| Example 4 | #2 | 2580 | 750 | #7 | 1770 | 1580 |
| Comp. Ex. 3 | #2 | 2580 | 750 | #8 | 1970 | 1540 |

TABLE 3 shows the magnetic characteristics of each of the first and second magnetic layer alone determined by VSM-3, manufactured by Toei Kogyo K.K., with an external magnetic field of 10 kOe applied thereto.

Then, the electromagnetic transducing characteristic of each of the magnetic recording disk samples was determined under the following conditions. The results are shown in TABLE 4.

SK505, manufactured by Tokyo Engineering K.K., was used as a recording-and-reproducing circuit to determine the characteristic of each magnetic recording disk sample inserted in a disk drive.

The recording frequency used for a low-range servo signal was 100 KHz, while the recording frequency used for a high-range data signal was 625 KHz.

The magnetic head used for recording the servo signal was a MIG-type head having a track width of 50 μm and a gap width of 1.0 μm.

While the magnetic recording disk was rotated at 360rpm, the measurement was conducted when the head is located at radiuses of 38 mm and 23 mm from the center of the disk.

The above-mentioned magnetic head was used to record the servo signal on the magnetic recording disk, which had been demagnetized by an alternating current, with a recording current of 50 mA.

After the servo signal was recorded, the data signal was overwritten thereon. Then, the signals were reproduced. The output components of the servo and data signals were determined by spectrum analyzer 3585 A manufactured by Yokogawa-Hewlett-Packard Company.

The maximum data signal output and the servo signal output were determined while the data signals were repeatedly recorded on the magnetic recording disk at radiuses of 23 mm and 38 mm with different currents.

TABLE 4

| | Data Signal Output Radius | | Servo Signal Output Radius | | Data Signal Output Fluctuation Radius | |
|---|---|---|---|---|---|---|
| | 23 mm (dB) | 38 mm (dB) | 23 mm (dB) | 38 mm (dB) | 23 mm (dB) | 38 mm (dB) |
| Comp. Ex. 1 | +6.8 | +12.9 | −6.5 | −0.4 | 3.2 | 0.7 |
| Example 1 | +6.4 | +12.5 | −4.5 | +0.3 | 0.7 | 0.4 |
| Example 2 | +6.7 | +13.2 | −4.2 | +1.5 | 0.6 | 0.4 |
| Comp. Ex. 2 | +4.8 | +14.1 | −4.3 | −0.5 | 0.6 | 0.7 |
| Example 3 | +5.6 | +13.8 | −4.1 | +0.3 | 0.5 | 0.5 |
| Example 4 | +7.3 | +11.7 | −4.4 | +1.3 | 0.7 | 0.4 |
| Comp. Ex. 3 | +7.9 | +10.6 | −5.3 | −2.1 | 1.2 | 1.0 |

Examples 5–7 and Comparative Examples 4–6

On one surface of a nonmagnetic substrate made of a polyethylene terephthalate base having a thickness of 60 μm, the above-mentioned first magnetic recording layer coating liquid No.1 containing the above-mentioned Powder #2 as the ferromagnetic powder was coated such that it would have a thickness shown in TABLE 5 when dried. Before the first coating was dried, the above-mentioned second magnetic recording layer coating liquid No.1 containing the above-mentioned Powder #6 as the ferromagnetic powder was coated thereon such that it would have a thickness shown in TABLE 5 when dried. Then, the magnetic particles in the magnetic layers were subjected to a random orientation before being dried.

Thereafter, two magnetic layers were formed on the other surface of the nonmagnetic substrate under the same condition as described above.

The magnetic recording medium thus obtained was pressure-molded by a supercalender roll to smooth the magnetic layer surfaces and then cut into a disk-like form. Thus, the magnetic recording disk was obtained.

TABLE 5 shows the magnetic layer constitution and magnetic characteristics of the magnetic recording disks thus obtained.

TABLE 5

| | First Magnetic Layer | | | Second Magnetic Layer | | |
|---|---|---|---|---|---|---|
| | Thickness (μm) | Coercive Force (Oe) | Residual Flux Density (Gauss) | Thickness (μm) | Coercive Force (Oe) | Residual Flux Density (Gauss) |
| Example 5 | 1.2 | 2580 | 750 | 0.3 | 1490 | 1620 |
| Example 6 | 1.2 | 2580 | 750 | 0.5 | 1490 | 1620 |
| Comp. Ex. 4 | 1.2 | 2580 | 750 | 0.8 | 1490 | 1620 |
| Comp. Ex. 5 | 0.7 | 2580 | 750 | 0.3 | 1490 | 1620 |
| Example 7 | 2.0 | 2580 | 750 | 0.3 | 1490 | 1620 |
| Comp. Ex. 6 | 2.8 | 2580 | 750 | 0.3 | 1490 | 1620 |

TABLE 6 shows the results of determination of the electromagnetic transducing characteristic of each magnetic recording disk sample.

TABLE 6

|  | Data Signal Output Radius | | Servo Signal Output Radius | | Data Signal Output Fluctuation Radius | |
|---|---|---|---|---|---|---|
|  | 23 mm (dB) | 38 mm (dB) | 23 mm (dB) | 38 mm (dB) | 23 mm (dB) | 38 mm (dB) |
| Example 5 | +6.4 | +12.5 | −4.5 | +0.3 | 0.7 | 0.5 |
| Example 6 | +6.3 | +12.7 | −5.0 | −1.2 | 1.0 | 0.9 |
| Comp. Ex. 4 | +5.8 | +12.6 | −7.1 | −3.2 | 3.5 | 1.2 |
| Comp. Ex. 5 | +6.1 | +12.4 | −4.2 | −0.5 | 0.6 | 0.8 |
| Example 7 | +6.5 | +12.7 | −4.3 | +0.5 | 0.7 | 0.5 |
| Comp. Ex. 6 | +6.4 | +12.6 | −6.8 | −2.0 | 3.3 | 1.0 |

Comparative Example 7

Second Magnetic Layer Coating Liquid No.2

A second magnetic layer coating liquid was obtained with the following composition in which Powder #6 was used as the ferromagnetic metal powder under the following condition.

| | |
|---|---|
| Ferromagnetic metal powder (Hc = 1480 Oe) | 100 parts by weight |
| Vinyl chloride-vinyl acetate copolymer containing maleic anhydride (degree of polymerization: 400) | 16 parts by weight |
| Polyurethane resin (Nihon Polyurethane N-2301) | 6 parts by weight |
| Carbon black (average particle diameter: 20 nm) | 7 parts by weight |
| α-Al$_2$O$_3$ (average particle diameter: 0.3 μm) | 15 parts by weight |
| Methyl ethyl ketone | 184 parts by weight |
| Cyclohexanone | 92 parts by weight |

After being kneaded by a powerful kneader, the above composition was minutely dispersed by a sand grinder. To 420 parts by weight of the minutely-dispersed liquid, the following ingredients were added and the mixture was stirred to obtain the second magnetic layer coating liquid No.2.

| | |
|---|---|
| Oleic acid | 1 part by weight |
| Butyl stearate | 2 parts by weight |
| Butoxyethyl stearate | 2 parts by weight |
| Polyisocyanate | 7 parts by weight |
| Methyl ethyl ketone | 45 parts by weight |
| Cyclohexanone | 23 parts by weight |

On one surface of a nonmagnetic substrate made of a polyethylene terephthalate base having a thickness of 60 μm, the above-mentioned first magnetic recording layer coating liquid No.1 containing the above-mentioned Powder #2 as the ferromagnetic powder was coated such that it would have a thickness of 1.2 μm when dried. Before the first coating was dried, the above-mentioned second magnetic recording layer coating liquid No.2 containing the above-mentioned Powder #6 as the ferromagnetic powder was coated thereon such that it would have a thickness of 0.3 μm when dried. Then, the magnetic particles in the magnetic layers were subjected to a random orientation before being dried.

Thereafter, two magnetic layers were formed on the other surface of the nonmagnetic substrate under the same condition as described above.

The magnetic recording medium thus obtained was pressure-molded by a supercalender roll to smooth the magnetic layer surfaces and then cut into a disk-like form. Thus, the magnetic recording disk was obtained.

TABLE 7 shows the magnetic layer constitution and magnetic characteristics of the magnetic recording disk thus obtained.

TABLE 7

|  | First Magnetic Layer | | | Second Magnetic Layer | | |
|---|---|---|---|---|---|---|
|  | Thickness (μm) | Coercive Force (Oe) | Residual Flux Density (Gauss) | Thickness (μm) | Coercive Force (Oe) | Residual Flux Density (Gauss) |
| Comp. Example 7 | 1.2 | 2580 | 750 | 0.3 | 1480 | 1300 |

TABLE 8 shows the electromagnetic transducing characteristic.

TABLE 8

|  | Data Signal Output Radius | | Servo Signal Output Radius | | Data Signal Output Fluctuation Radius | |
|---|---|---|---|---|---|---|
|  | 23 mm (dB) | 38 mm (dB) | 23 mm (dB) | 38 mm (dB) | 23 mm (dB) | 38 mm (dB) |
| Comp. Ex. 7 | +4.3 | +10.8 | −4.3 | −0.4 | 0.7 | 0.5 |

Comparative Examples 8 and 9

The following two kinds of first magnetic layer coating liquids No.2 and No.3 in which Powder #2 was used as the ferromagnetic metal powder were prepared under the same condition as the first magnetic layer coating liquid No.1.

| | First Magnetic Layer Coating Liquid | |
|---|---|---|
| Composition (parts by weight) | No. 2 | No. 3 |
| [A] | | |
| Ferromagnetic metal powder (Hc = 2500 Oe) | 100 | 100 |
| Vinyl chloride-vinyl acetate copolymer containing maleic anhydride (degree of polymerization: 400) | 17 | 18 |
| Polyurethane resin (Nihon Polyurethane N-2301) | 7.5 | 8 |
| Carbon black (average particle diameter: 20 nm) | 10 | 30 |
| α-iron oxide | 20 | 30 |
| Methyl ethyl ketone | 147 | 140 |
| Cyclohexanone | 98.5 | 94 |
| [B] | | |
| Oleic acid | 2 | 2 |
| Butyl stearate | 3 | 3 |
| Butoxyethyl stearate | 3 | 3 |
| Polyisocyanate | 6.5 | 7 |
| Methyl ethyl ketone | 30.5 | 31 |
| Cyclohexanone | 21 | 21 |

After part [A] of the composition was kneaded by a powerful kneader and then minutely dispersed by a sand-grinder, part [B] of the composition was added thereto and the mixture was stirred to form the first magnetic layer coating.

On one surface of a nonmagnetic substrate made of a polyethylene terephthalate base having a thickness of 60 μm, the above-mentioned first magnetic recording layer coating liquid No.2 or No.3 containing the above-mentioned Powder #2 as the ferromagnetic powder was coated such that it would have a thickness of 1.2 μm when dried. Before the first coating was dried, the above-mentioned second magnetic recording layer coating liquid No.1 containing the above-mentioned Powder #6 as the ferromagnetic powder was coated thereon such that it would have a thickness of 0.3 μm when dried. Then, the magnetic particles in the magnetic layers were subjected to a random orientation before being dried.

Thereafter, two magnetic layers were formed on the other surface of the nonmagnetic substrate under the same condition as described above.

The magnetic recording medium thus obtained was pressure-molded by a supercalender roll to smooth the magnetic layer surfaces and then cut into a disk-like form. Thus, the magnetic recording disk was obtained.

TABLE 9 shows the magnetic layer constitution and magnetic characteristics of the magnetic recording disks thus obtained.

TABLE 9

|  | | First Magnetic Layer | | Second Magnetic Layer | |
| --- | --- | --- | --- | --- | --- |
|  | Coating Liquid No. | Coercive Force (Oe) | Residual Flux Density (Gauss) | Coercive Force (Oe) | Residual Flux Density (Gauss) |
| Comp. Ex. 8 | 2 | 2560 | 1220 | 1490 | 1620 |
| Comp. Ex. 9 | 3 | 2580 | 410 | 1490 | 1620 |

TABLE 10 shows the electromagnetic transducing characteristic.

TABLE 10

|  | Data Signal Output Radius | | Servo Signal Output Radius | | Data Signal Output Fluctuation Radius | |
| --- | --- | --- | --- | --- | --- |
|  | 23 mm (dB) | 38 mm (dB) | 23 mm (dB) | 38 mm (dB) | 23 mm (dB) | 38 mm (dB) |
| Comp. Ex. 8 | +6.7 | +12.6 | −6.8 | −3.4 | 3.3 | 1.3 |
| Comp. Ex. 9 | +6.5 | +12.4 | −7.2 | −3.1 | 3.6 | 1.3 |

Examples 8–11 and Comparative Examples 10–12

First magnetic layer coating liquids were obtained with hexagonal barium ferrite magnetic powders shown in TABLE 11 in accordance with the following composition and condition.

| First Magnetic Layer Coating Liquid No. 4 | |
| --- | --- |
| Ferromagnetic metal powder (shown in Table 11) | 100 parts by weight |
| Vinyl chloride-vinyl acetate copolymer containing maleic anhydride (degree of polymerization: 400) | 15 parts by weight |
| Polyurethane resin (Nihon Polyurethane N-2301) | 6.5 parts by weight |
| Carbon black (average particle diameter: 20 nm) | 5 parts by weight |
| Methyl ethyl ketone | 131 parts by weight |
| Cyclohexanone | 92.5 parts by weight |

After being kneaded by a powerful kneader, the above composition was minutely dispersed by a sand grinder. To 350 parts by weight of the minutely-dispersed liquid, the following ingredients were added and the mixture was stirred to obtain three kinds of the first magnetic layer coating liquids containing different ferromagnetic powders.

| Oleic acid | 2.0 parts by weight |
| --- | --- |
| Butyl stearate | 3.0 parts by weight |
| Butoxyethyl stearate | 3.0 parts by weight |
| Polyisocyanate | 6.0 parts by weight |
| Methyl ethyl ketone | 42.0 parts by weight |
| Cyclohexanone | 29.0 parts by weight |

TABLE 11

| Ferromagnetic Metal Powder | Coercive Force (Oe) |
| --- | --- |
| Powder #9 | 2150 |
| Powder #10 | 2550 |
| Powder #11 | 3000 |

On one surface of a nonmagnetic substrate made of a polyethylene terephthalate base having a thickness of 60 μm, the above-mentioned first magnetic recording layer coating liquid No.4 was coated such that it would have a thickness of 1.2 μm when dried. Before the first coating was dried, the above-mentioned second magnetic recording layer coating liquid No.1 containing Powder #4, 5, 6, 7, or 8 was coated thereon such that it would have a thickness of 0.3 μm when dried. Then, the magnetic particles in the magnetic layers were subjected to a random orientation before being dried.

Thereafter, two magnetic layers were formed on the other surface of the nonmagnetic substrate under the same condition as described above.

The magnetic recording medium thus obtained was pressure-molded by a supercalender roll to smooth the magnetic layer surfaces and then cut into a disk-like form. Thus, the magnetic recording disk was obtained.

TABLE 12 shows the magnetic layer constitution and magnetic characteristics of the magnetic recording disks thus obtained.

TABLE 12

|  | First Magnetic Layer | | | Second Magnetic Layer | | |
| --- | --- | --- | --- | --- | --- | --- |
|  | Ferromagnetic powder | Coercive Force (Oe) | Residual Flux Density (Gauss) | Ferromagnetic powder | Coercive Force (Oe) | Residual Flux Density (Gauss) |
| Comp. Ex. 10 | #9 | 2210 | 770 | #6 | 1490 | 1620 |
| Example 8 | #10 | 2590 | 730 | #6 | 1490 | 1620 |

TABLE 12-continued

| | First Magnetic Layer | | | Second Magnetic Layer | | |
|---|---|---|---|---|---|---|
| | Ferromagnetic powder | Coercive Force (Oe) | Residual Flux Density (Gauss) | Ferromagnetic powder | Coercive Force (Oe) | Residual Flux Density (Gauss) |
| Example 9 | #11 | 3030 | 680 | #6 | 1490 | 1620 |
| Comp. Ex. 11 | #10 | 2590 | 730 | #4 | 1040 | 1690 |
| Example 10 | #10 | 2590 | 730 | #5 | 1270 | 1640 |
| Example 11 | #10 | 2590 | 730 | #7 | 1770 | 1580 |
| Comp. Ex. 12 | #10 | 2590 | 730 | #8 | 1970 | 1540 |

TABLE 13 shows the electromagnetic transducing characteristic.

TABLE 13

| | Data Signal Output Radius | | Servo Signal Output Radius | | Data Signal Output Fluctuation Radius | |
|---|---|---|---|---|---|---|
| | 23 mm (dB) | 38 mm (dB) | 23 mm (dB) | 38 mm (dB) | 23 mm (dB) | 38 mm (dB) |
| Comp. Ex. 10 | +6.5 | +12.6 | −7.0 | −1.0 | 3.3 | 1.0 |
| Example 8 | +6.1 | +12.2 | −4.4 | −0.5 | 0.7 | 0.7 |
| Example 9 | +6.4 | +12.9 | −3.8 | +0.7 | 0.4 | 0.4 |
| Comp. Ex. 11 | +4.3 | +13.7 | −4.4 | −1.0 | 0.6 | 1.0 |
| Example 10 | +5.4 | +13.5 | −3.7 | −0.5 | 0.4 | 0.5 |
| Example 11 | +7.0 | +11.4 | −4.5 | +0.5 | 0.7 | 0.5 |
| Comp. Ex. 12 | +7.7 | +10.1 | −5.8 | −2.9 | 1.5 | 1.2 |

Examples 12–14 and Comparative Examples 13–15

On one surface of a nonmagnetic substrate made of a polyethylene terephthalate base having a thickness of 60 μm, the above-mentioned first magnetic recording layer coating liquid No.4 containing the above-mentioned Powder #11 as the ferromagnetic powder was coated such that it would have a thickness shown in TABLE 14 when dried. Before the first coating was dried, the above-mentioned second magnetic recording layer coating liquid No.1 containing the above-mentioned Powder #6 was coated thereon such that it would have a thickness shown in TABLE 14 when dried. Then, the magnetic particles in the magnetic layers were subjected to a random orientation before being dried.

Thereafter, two magnetic layers were formed on the other surface of the nonmagnetic substrate under the same condition as described above.

The magnetic recording medium thus obtained was pressure-molded by a supercalender roll to smooth the magnetic layer surfaces and then cut into a disk-like form. Thus, the magnetic recording disk was obtained.

TABLE 14 shows the magnetic layer constitution and magnetic characteristics of the magnetic recording disks thus obtained.

TABLE 14

| | First Magnetic Layer | | | Second Magnetic Layer | | |
|---|---|---|---|---|---|---|
| | Thickness (μM) | Coercive Force (Oe) | Residual Flux Density (Gauss) | Thickness (μm) | Coercive Force (Oe) | Residual Flux Density (Gauss) |
| Example 12 | 1.2 | 3030 | 690 | 0.3 | 1490 | 1620 |
| Example 13 | 1.2 | 3030 | 690 | 0.5 | 1490 | 1620 |
| Comp. Ex. 13 | 1.2 | 3030 | 690 | 0.8 | 1490 | 1620 |
| Comp. Ex. 14 | 0.7 | 3030 | 690 | 0.3 | 1490 | 1620 |
| Example 14 | 2.0 | 3030 | 690 | 0.3 | 1490 | 1620 |
| Comp. Ex. 15 | 2.8 | 3030 | 690 | 0.3 | 1490 | 1620 |

TABLE 15 shows the results of determination of the electromagnetic transducing characteristic of each magnetic recording medium sample.

TABLE 15

| | Data Signal Output Radius | | Servo Signal Output Radius | | Data Signal Output Fluctuation Radius | |
|---|---|---|---|---|---|---|
| | 23 mm (dB) | 38 mm (dB) | 23 mm (dB) | 38 mm (dB) | 23 mm (dB) | 38 mm (dB) |
| Example 12 | +6.4 | +12.3 | −3.8 | +0.7 | 0.4 | 0.4 |
| Example 13 | +6.2 | +12.5 | −4.1 | −0.7 | 0.7 | 0.7 |
| Comp. Ex. 13 | +5.4 | +12.4 | −6.5 | −2.9 | 1.6 | 1.2 |
| Comp. Ex. 14 | +5.6 | +12.0 | −4.2 | −0.5 | 0.6 | 0.7 |
| Example 14 | +6.5 | +12.5 | −3.9 | +0.5 | 0.5 | 0.4 |
| Comp. Ex. 15 | +6.4 | +12.4 | −6.2 | −2.0 | 1.5 | 1.0 |

Comparative Example 16

On one surface of a nonmagnetic substrate made of a polyethylene terephthalate base having a thickness of 60 μm, the above-mentioned first magnetic recording layer coating liquid No.4 containing the above-mentioned Powder #11 as the ferromagnetic powder was coated such that it would have a thickness of 1.2 μm when dried. Before the first coating was dried, the above-mentioned second magnetic recording layer coating liquid No.2 containing the above-mentioned Powder #6 was coated thereon such that it would have a thickness of 0.3 μm when dried. Then, the magnetic particles in the magnetic layers were subjected to a random orientation before being dried.

Thereafter, two magnetic layers were formed on the other surface of the nonmagnetic substrate under the same condition as described above.

The magnetic recording medium thus obtained was pressure-molded by a supercalender roll to smooth the magnetic layer surfaces and then cut into a disk-like form. Thus, the magnetic recording disk was obtained.

TABLE 16 shows the magnetic layer constitution and magnetic characteristics of the magnetic recording disk thus obtained.

TABLE 16

| | First Magnetic Layer | | | Second Magnetic Layer | | |
|---|---|---|---|---|---|---|
| | Thickness (μm) | Coercive Force (Oe) | Residual Flux Density (Gauss) | Thickness (μm) | Coercive Force (Oe) | Residual Flux Density (Gauss) |
| Comp. Ex. 16 | 1.2 | 3030 | 690 | 0.3 | 1480 | 1300 |

TABLE 17 shows the electromagnetic transducing characteristic.

TABLE 17

| | Data Signal Output Radius | | Servo Signal Output Radius | | Data Signal Output Fluctuation Radius | |
|---|---|---|---|---|---|---|
| | 23 mm (dB) | 38 mm (dB) | 23 mm (dB) | 38 mm (dB) | 23 mm (dB) | 38 mm (dB) |
| Comp. Ex. 16 | +3.8 | +10.3 | −4.3 | −0.4 | 0.7 | 0.5 |

Comparative Examples 17 and 18

The following two kinds of first magnetic layer coating liquids No.5 and No.6 in which the barium ferrite magnetic powder of Powder #11 was used as the ferromagnetic metal powder were prepared under the same condition as the first magnetic layer coating liquid No.2 or No.3.

| | First Magnetic Layer Coating Liquid | |
|---|---|---|
| Composition (parts by weight) | No. 5 | No. 6 |
| [A] | | |
| Barium ferrite powder (Hc = 3000 Oe) | 100 | 100 |
| Vinyl chloride-vinyl acetate copolymer containing maleic anhydride (degree of polymerization: 400) | 10.5 | 18 |
| Polyurethane resin (Nihon Polyurethane N-2301) | 4 | 8 |
| Carbon black (average particle diameter: 20 nm) | 5 | 25 |
| α-iron oxide | 20 | 30 |
| Methyl ethyl ketone | 147 | 140 |
| Cyclohexanone | 98.5 | 94 |
| [B] | | |
| Oleic acid | 2 | 2 |
| Butyl stearate | 3 | 3 |
| Butoxyethyl stearate | 3 | 3 |
| Polyisocyanate | 3.5 | 7 |
| Methyl ethyl ketone | 30.5 | 31 |
| Cyclohexanone | 21 | 21 |

On one surface of a nonmagnetic substrate made of a polyethylene terephthalate base having a thickness of 60 μm, the above-mentioned first magnetic recording layer coating liquid No.5 or No.6 containing the above-mentioned Powder #11 as the ferromagnetic powder was coated such that it would have a thickness of 1.2 μm when dried. Before the first coating was dried, the above-mentioned second magnetic recording layer coating liquid No.1 containing the above-mentioned Powder #6 as the ferromagnetic powder was coated thereon such that it would have a thickness of 0.3 μm when dried. Then, the magnetic particles in the magnetic layers were subjected to a random orientation before being dried.

Thereafter, two magnetic layers were formed on the other surface of the nonmagnetic substrate under the same condition as described above.

The magnetic recording medium thus obtained was pressure-molded by a supercalender roll to smooth the magnetic layer surfaces and then cut into a disk-like form. Thus, the magnetic recording disk was obtained.

TABLE 18 shows the magnetic layer constitution and magnetic characteristics of the magnetic recording disks thus obtained.

TABLE 18

| | | First Magnetic Layer | | Second Magnetic Layer | |
|---|---|---|---|---|---|
| | Coating Liquid No. | Coercive Force (Oe) | Residual Flux Density (Gauss) | Coercive Force (Oe) | Residual Flux Density (Gauss) |
| Comp. Ex. 17 | 5 | 3010 | 1190 | 1490 | 1620 |
| Comp. Ex. 18 | 6 | 3040 | 390 | 1490 | 1620 |

TABLE 19 shows the electromagnetic transducing characteristic.

TABLE 19

| | Data Signal Output Radius | | Servo Signal Output Radius | | Data Signal Output Fluctuation Radius | |
|---|---|---|---|---|---|---|
| | 23 mm (db) | 38 mm (db) | 23 mm (db) | 38 mm (db) | 23 mm (db) | 38 mm (db) |
| Comp. Ex. 17 | +6.4 | +12.5 | −6.6 | −3.5 | 3.3 | 1.3 |
| Comp. Ex. 18 | +6.3 | +12.3 | −7.0 | −3.2 | 3.6 | 1.2 |

Experiment II-1

1) First Magnetic Layer Coating

First magnetic layer coatings were obtained with the Fe—Ni—Co ferromagnetic metal powders shown in TABLE 20 according to the same composition and operation as Example 1 of Experiment I.

TABLE 20

| Ferromagnetic Metal Powder Sample # | Coercive Force (Oe) |
|---|---|
| 1' | 2000 |
| 2' | 2570 |
| 3' | 1790 |

The coatings thus obtained were named as shown in TABLE 21 according to the ferromagnetic metal powder samples used.

TABLE 21

| First Magnetic Layer Coating | Ferromagnetic Metal Powder Sample # |
|---|---|
| A | 1' |
| B | 2' |
| C | 3' |

2) Second Magnetic Layer Coating

Second magnetic layer coating D was obtained with an Fe—Ne ferromagnetic metal powder (Hc=1480) according to the same composition and operation as those of Example 1 of Experiment I.

3) Nonmagnetic Layer Coating

| | |
|---|---|
| α-Fe$_2$O$_3$ | 100 parts by weight |
| Carbon black (average particle diameter: 20 nm) | 60 parts by weight |
| Vinyl chloride-vinyl acetate copolymer containing maleic anhydride (degree of polymerization: 400) | 24 parts by weight |
| Polyurethane resin (Nihon Polyurethane N-2301) | 9 parts by weight |
| Oleic acid | 1.5 parts by weight |
| Butyl stearate | 3 parts by weight |
| Butoxyethyl stearate | 3 parts by weight |
| Methyl ethyl ketone | 131.5 parts by weight |
| Cyclohexanone | 92 parts by weight |

After being stirred by a dissolver at a high speed, the above composition was minutely dispersed by a sand grinder. To 420 parts by weight of the minutely-dispersed liquid, the following ingredients were added and the mixture was stirred to obtain the nonmagnetic layer coating.

| | |
|---|---|
| Polyisocyanate | 10.5 parts by weight |
| Methyl ethyl ketone | 45 parts by weight |
| Cyclohexanone | 23 parts by weight |

On one surface of a nonmagnetic substrate made of a polyethylene terephthalate base having a thickness of 60 μm, the above-mentioned first magnetic recording layer coating was coated such that it would have a thickness of 1.2 μm when dried. Before the first coating was dried, the nonmagnetic layer coating was coated thereon such that it would have a thickness of 0.1 μm, 0.2 μm, or 0.3 μm when dried. Before the nonmagnetic coating was dried, the above-mentioned second magnetic layer coating was coated thereon such that it would have a thickness of 0.3 μm or 0.4 μm when dried. Then, the magnetic particles in the magnetic layers were subjected to a random orientation before being dried.

Thereafter, two magnetic layers holding a nonmagnetic layer therebetween were formed on the other surface of the nonmagnetic substrate under the same condition as described above.

The raw magnetic material thus obtained was planished by a supercalender roll and then cut into a disk-like form. Thus, the magnetic recording disk was obtained.

The characteristics of the magnetic recording disks thus obtained were evaluated in the same manner as Example 1 of Experiment I.

TABLE 22 shows the magnetic layer constitution and characteristics of the magnetic recording disks. In the following tables, "*" indicates the samples belonging to Comparative Examples.

TABLE 22

| Magnetic Disk Sample | First Magnetic Layer | | | | Second Magentic Layer | | | | Thickness of Nonmagnetic Layer (μm) | Radius: 38 mm | | Radius: 23 mm | |
|---|---|---|---|---|---|---|---|---|---|---|---|---|---|
| | Coating | Thickness (μm) | Hc (Oe) | Br (G) | Coating | Thickness (μm) | Hc (Oe) | Br (G) | | Data Output (dBm) | Servo Output (dBm) | Data Output (dBm) | Servo Output (dBm) |
| D-1 | A | 1.2 | 2000 | 790 | D | 0.3 | 1490 | 1620 | 0.1 | 12.7 | −1.4 | 6.8 | −7.5 |
| D-2 | B | 1.2 | 2580 | 790 | D | 0.3 | 1490 | 1620 | 0.1 | 12.6 | −0.4 | 6.7 | −5.4 |
| *D-3 | C | 1.2 | 1800 | 780 | D | 0.3 | 1490 | 1620 | 0.1 | 12.8 | −2.5 | 6.5 | −8.0 |
| D-4 | A | 1.2 | 2000 | 790 | D | 0.3 | 1490 | 1620 | 0.2 | 12.6 | −2.7 | 6.7 | −8.2 |
| D-5 | B | 1.2 | 2580 | 790 | D | 0.3 | 1490 | 1620 | 0.2 | 12.7 | −2.0 | 6.8 | −6.7 |
| *D-6 | C | 1.2 | 1800 | 780 | D | 0.3 | 1490 | 1620 | 0.2 | 12.7 | −4.0 | 6.6 | −9.2 |
| *D-7 | A | 1.2 | 2000 | 790 | D | 0.4 | 1490 | 1620 | 0.3 | 12.8 | −5.2 | 6.8 | −11.2 |
| *D-8 | B | 1.2 | 2580 | 790 | D | 0.4 | 1490 | 1620 | 0.3 | 12.6 | −4.8 | 6.6 | −10.8 |
| *D-9 | C | 1.2 | 1800 | 780 | D | 0.4 | 1490 | 1620 | 0.3 | 12.5 | −7.0 | 6.7 | −13.2 |

Experiment II-2

First ferromagnetic metal coatings E and F were respectively obtained according to the compositions and operations of ferromagnetic metal coating liquids No.2 and No.3 in Comparative Examples 8 and 9 of Experiment I except that a ferromagnetic metal powder sample having a coercive force of 2200 Oe is used. On the other hand, with the same ferromagnetic powder (Hc=2200 Oe), first magnetic layer coating G was obtained according to the composition of Experiment II-1.

On one surface of a nonmagnetic substrate made of a polyethylene terephthalate base having a thickness of 60 μm, the above-mentioned first magnetic recording layer coating was coated such that it would have a thickness of 1.2 μm when dried. Before the first coating was dried, the nonmagnetic layer coating same as that of Experiment II-1 was coated thereon such that it would have a thickness of 0.1 μm when dried. Before the nonmagnetic coating was dried, the above-mentioned second magnetic layer coating D was coated thereon such that it would have a thickness of 0.3 μm when dried. Then, the magnetic particles in the magnetic layers were subjected to a random orientation before being dried.

Thereafter, two magnetic layers holding a nonmagnetic layer therebetween were formed on the other surface of the nonmagnetic substrate under the same condition as described above.

The raw magnetic material thus obtained was planished by a supercalender roll and then cut into a disk-like form. Thus, the magnetic recording disk was obtained.

TABLE 23 shows the magnetic layer constitution and characteristics of the magnetic recording disks which were determined in the same manner as Experiment II-1.

TABLE 25

| Second Magnetic Layer Coating | Ferromagnetic Metal Powder Sample # |
|---|---|
| H | 4' |
| I | 5' |
| J | 6' |
| K | 7' |

On one surface of a nonmagnetic substrate made of a polyethylene terephthalate base having a thickness of 60 μm, the above-mentioned first magnetic recording layer coating G was coated such that it would have a thickness of 1.2 μm

TABLE 23

| Magnetic Disk Sample | First Magnetic Layer | | | | Second Magentic Layer | | | | Thickness of Nonmagnetic Layer (μm) | Radius: 38 mm | | Radius: 23 mm | |
|---|---|---|---|---|---|---|---|---|---|---|---|---|---|
| | Coating | Thickness (μm) | Hc (Oe) | Br (G) | Coating | Thickness (μm) | Hc (Oe) | Br (G) | | Data Output (dBm) | Servo Output (dBm) | Data Output (dBm) | Servo Output (dBm) |
| D-10 | G | 1.2 | 2200 | 790 | D | 0.3 | 1490 | 1620 | 0.1 | 12.7 | −0.7 | 6.8 | −6.7 |
| *D-11 | E | 1.2 | 2200 | 1220 | D | 0.3 | 1490 | 1620 | 0.1 | 12.5 | −2.3 | 6.7 | −7.7 |
| *D-12 | F | 1.2 | 2200 | 410 | D | 0.3 | 1490 | 1620 | 0.1 | 12.3 | −4.2 | 6.5 | −12.5 |

Experiment II-3

1) First Magnetic Layer Coating

First magnetic layer coating G formed in Experiment II-2 with the ferromagnetic metal powder sample having a coercive force of 2000 Oe was used.

2) Second Magnetic Layer Coating

Second magnetic layer coatings were obtained with the Fe—Ni ferromagnetic metal powders shown in TABLE 24 according to the same composition and operation as Example 8 of Experiment I.

TABLE 24

| Ferromagnetic Metal Powder Sample # | Coercive Force (Oe) |
|---|---|
| 4' | 1050 |
| 5' | 1270 |
| 6' | 1760 |
| 7' | 1950 |

The coatings thus obtained were named as shown in TABLE 25 according to the ferromagnetic metal powder samples used.

when dried. Before the first coating was dried, the nonmagnetic layer coating same as that of Experiment II-1 was coated thereon such that it would have a thickness of 0.1 μm when dried. Before the nonmagnetic coating was dried, the above-mentioned second magnetic layer coating was coated thereon such that it would have a thickness of 0.3 μm when dried. Then, the magnetic particles in the magnetic layers were subjected to a random orientation before being dried.

Thereafter, two magnetic layers holding a nonmagnetic layer therebetween were formed on the other surface of the nonmagnetic substrate under the same condition as described above.

The raw magnetic material thus obtained was planished by a supercalender roll and then cut into a disk-like form. Thus, the magnetic recording disk was obtained.

TABLE 26 shows the magnetic layer constitution and characteristics of the magnetic recording disks which were determined in the same manner as Experiment II-1.

TABLE 26

| Magnetic Disk Sample | First Magnetic Layer | | | | Second Magentic Layer | | | | Thickness of Nonmagnetic Layer (μm) | Radius: 38 mm | | Radius: 23 mm | |
|---|---|---|---|---|---|---|---|---|---|---|---|---|---|
| | Coating | Thickness (μm) | Hc (Oe) | Br (G) | Coating | Thickness (μm) | Hc (Oe) | Br (G) | | Data Output (dBm) | Servo Output (dBm) | Data Output (dBm) | Servo Output (dBm) |
| *D-13 | G | 1.2 | 2200 | 790 | H | 0.3 | 1040 | 1690 | 0.1 | 13.5 | −1.2 | 5.2 | −7.2 |
| *D-14 | G | 1.2 | 2200 | 790 | I | 0.3 | 1170 | 1640 | 0.1 | 13.3 | −1.3 | 5.8 | −6.8 |
| D-15 | G | 1.2 | 2200 | 790 | J | 0.3 | 1770 | 1600 | 0.1 | 11.7 | −4.8 | 7.1 | −9.2 |
| *D-16 | G | 1.2 | 2200 | 790 | K | 0.3 | 1970 | 1540 | 0.1 | 10.5 | −5.2 | 8.1 | −9.7 |

Experiment II-4

On one surface of a nonmagnetic substrate made of a polyethylene terephthalate base having a thickness of 60 μm, the above-mentioned first magnetic recording layer coating G was coated such that it would have a thickness of 1.2 μm when dried. Before the first coating was dried, the nonmagnetic layer coating same as that of Experiment II-1 was coated thereon such that it would have a thickness of 0.1 μm when dried. Before the nonmagnetic coating was dried, the above-mentioned second magnetic layer coating D was coated thereon such that it would have a thickness of 0.3 μm, 0.5 μm, or 0.8 μm when dried. Then, the magnetic particles in the magnetic layers were subjected to a random orientation before being dried.

Thereafter, two magnetic layers holding a nonmagnetic layer therebetween were formed on the other surface of the nonmagnetic substrate under the same condition as described above.

The raw magnetic material thus obtained was planished by a supercalender roll and then cut into a disk-like form. Thus, the magnetic recording disk was obtained.

TABLE 28 shows the magnetic layer constitution and characteristics of the magnetic recording disks which were determined in the same manner as Experiment II-1.

TABLE 28

| Magnetic Disk Sample | First Magnetic Layer | | | | Second Magentic Layer | | | | Thickness of Nonmagnetic Layer (μm) | Radius: 38 mm | | Radius: 23 mm | |
|---|---|---|---|---|---|---|---|---|---|---|---|---|---|
| | Coating | Thickness (μm) | Hc (Oe) | Br (G) | Coating | Thickness (μm) | Hc (Oe) | Br (G) | | Data Output (dBm) | Servo Output (dBm) | Data Output (dBm) | Servo Output (dBm) |
| D-10 | G | 1.2 | 2200 | 790 | D | 0.3 | 1480 | 1620 | 0.1 | 12.7 | −0.7 | 6.8 | −6.7 |
| *D-19 | G | 1.2 | 2200 | 790 | L | 0.3 | 1480 | 1300 | 0.1 | 10.5 | −0.7 | 4.2 | −5.8 | in the magnetic layers were subjected to a random orientation before being dried.

Thereafter, two magnetic layers holding a nonmagnetic layer therebetween were formed on the other surface of the nonmagnetic substrate under the same condition as described above.

The raw magnetic material thus obtained was planished by a supercalender roll and then cut into a disk-like form. Thus, the magnetic recording disk was obtained.

TABLE 27 shows the magnetic layer constitution and characteristics of the magnetic recording disks which were determined in the same manner as Experiment II-1.

TABLE 27

| Magnetic Disk Sample | First Magnetic Layer | | | | Second Magentic Layer | | | | Thickness of Nonmagnetic Layer (μm) | Radius: 38 mm | | Radius: 23 mm | |
|---|---|---|---|---|---|---|---|---|---|---|---|---|---|
| | Coating | Thickness (μm) | Hc (Oe) | Br (G) | Coating | Thickness (μm) | Hc (Oe) | Br (G) | | Data Output (dBm) | Servo Output (dBm) | Data Output (dBm) | Servo Output (dBm) |
| D-10 | G | 1.2 | 2200 | 790 | D | 0.3 | 1490 | 1620 | 0.1 | 12.7 | −0.7 | 6.8 | −6.7 |
| D-17 | G | 1.2 | 2200 | 790 | D | 0.5 | 1490 | 1620 | 0.1 | 13.2 | −5.2 | 5.4 | −11.1 |
| *D-18 | G | 1.2 | 2200 | 790 | D | 0.8 | 1490 | 1620 | 0.1 | 13.7 | −8.3 | 5.2 | −14.3 |

Experiment II-5

Second magnetic layer coating L was obtained with ferromagnetic metal powder sample #7' according to the same composition and operation as Comparative Example 16 of Experiment I.

On one surface of a nonmagnetic substrate made of a polyethylene terephthalate base having a thickness of 60 μm, the above-mentioned first magnetic recording layer coating G was coated such that it would have a thickness of 1.2 μm when dried. Before the first coating was dried, the nonmagnetic layer coating same as that of Experiment II-1 was coated thereon such that it would have a thickness of 0.1 μm when dried. Before the nonmagnetic coating was dried, the above-mentioned second magnetic layer coating L was coated thereon such that it would have a thickness of 0.3 μm when dried. Then, the magnetic particles in the magnetic layers were subjected to a random orientation before being dried.

Thereafter, two magnetic layers holding a nonmagnetic layer therebetween were formed on the other surface of the nonmagnetic substrate under the same condition as described above.

The raw magnetic material thus obtained was planished by a supercalender roll and then cut into a disk-like form. Thus, the magnetic recording disk was obtained.

TABLE 28 shows the magnetic layer constitution and characteristics of the magnetic recording disks which were determined in the same manner as Experiment II-1.

What is claimed is:

1. A magnetic recording medium comprising a nonmagnetic substrate, a first magnetic layer, and a second magnetic layer, said first magnetic layer being mounted on said nonmagnetic substrate, said second magnetic layer being mounted on said first magnetic layer adjacent to said first magnetic layer, said first and second magnetic layer being mainly composed of a ferromagnetic powder and a binder resin, said second magnetic layer having a thickness within the range of 0.05–0.5 μm and a coercive force within the range of 1200–2000, said first magnetic layer having a coercive force greater than that of said second magnetic layer by 800–2500, and residual flux density of said first magnetic layer alone being 30–70% of that of said second magnetic layer alone.

2. A magnetic recording medium as defined in claim 1 in which said magnetic recording medium is used for recording and reproducing a digital signal having a recording wavelength not greater than 3.0 μm.

3. A magnetic recording medium as defined in claim 1 in which said first magnetic layer contains a ferromagnetic powder made of a plate-like hexagonal ferrite.

4. A magnetic recording medium as defined in claim 1 in which said first magnetic layer contains a ferromagnetic metal powder.

5. A magnetic recording medium comprising a nonmagnetic substrate, a first magnetic layer, a nonmagnetic layer, and a second magnetic layer, said first magnetic layer being mounted on said nonmagnetic substrate, said nonmagnetic layer being mounted on said first magnetic layer, said second magnetic layer being mounted on said nonmagnetic layer, said first magnetic layer having a coercive force not smaller than 2000 and a residual flux density within the range of 30–70% of that of said second magnetic layer, said nonmagnetic layer having a thickness within the range of 0.05–0.25 μnm and said second magnetic layer having a coercive force not smaller than 1200, a residual flux density not lower than 1600, and a thickness not greater than 0.5 μm.

6. A magnetic recording medium as defined in claim 5 in which said magnetic recording medium is used for recording and reproducing a digital signal having a recording wavelength not greater than 3.0 μwith a servo signal having a recording wavelength not smaller than 5.0 μm.

7. A magnetic recording medium as defined in claim 5 in which said nonmagnetic layer contains electrically-conductive particles.

8. A magnetic recording medium as defined in claim 5 in which said second magnetic layer has a coercive force not greater than 75% of that of said first magnetic layer.

9. A magnetic recording medium as defined in claim 5 in which said first magnetic layer contains a ferromagnetic powder made of a plate-like hexagonal ferrite.

10. A magnetic recording medium as defined in claim 5 in which said first magnetic layer contains a ferromagnetic metal powder.

* * * * *